(No Model.)

T. W. HARRISON.
CAR COUPLING.

No. 374,870. Patented Dec. 13, 1887.

Witnesses:

Inventor
Thomas W. Harrison

UNITED STATES PATENT OFFICE.

THOMAS W. HARRISON, OF EMMETSBURG, IOWA.

CAR-COUPLING.

SPECIFICATION forming part of Letters Patent No. 374,870, dated December 13, 1887.

Application filed August 2, 1887. Serial No. 245,994. (No model.)

*To all whom it may concern:*

Be it known that I, THOMAS W. HARRISON, a citizen of the United States, residing at Emmetsburg, in the county of Palo Alto and State of Iowa, have invented certain new and useful Improvements in Couplers for Cars, Vehicles, and other Apparatus; and I do hereby declare the following to be a full, clear, and exact description of the invention, such as will enable others skilled in the art to which it appertains to make and use the same.

My invention is a coupler for cars, vehicles, and other apparatus required to be coupled together; and the objects of my said invention are, first, to provide a secure and convenient coupler for cars, vehicles, and all other apparatus required to be coupled together; second, to provide a secure and convenient coupler for cars, vehicles, and other apparatus which will lock and fasten or couple itself when the two parts are placed in proper position and pushed together; third, to provide a secure and convenient coupler for cars, vehicles, and other apparatus required to be coupled together, that will uncouple itself when the spring-head $g$ is withdrawn from the slot $i$ and the two parts of the coupler are drawn apart; fourth, to provide an automatic coupler for cars, vehicles, and other apparatus, so that the cars, vehicles, and other apparatus requiring a coupler can be coupled and fastened together without requiring any person to go between or reach between the cars, vehicles, or other apparatus in order to couple and fasten them together; fifth, to provide an automatic coupler for cars, vehicles, and other apparatus, so that the cars, vehicles, or other apparatus requiring a coupler can be uncoupled and drawn apart without requiring any person to go or reach between the cars, vehicles, or other apparatus in order to uncouple the same. I attain these objects by the mechanism illustrated in the accompanying drawings, in which—

Figure 1:
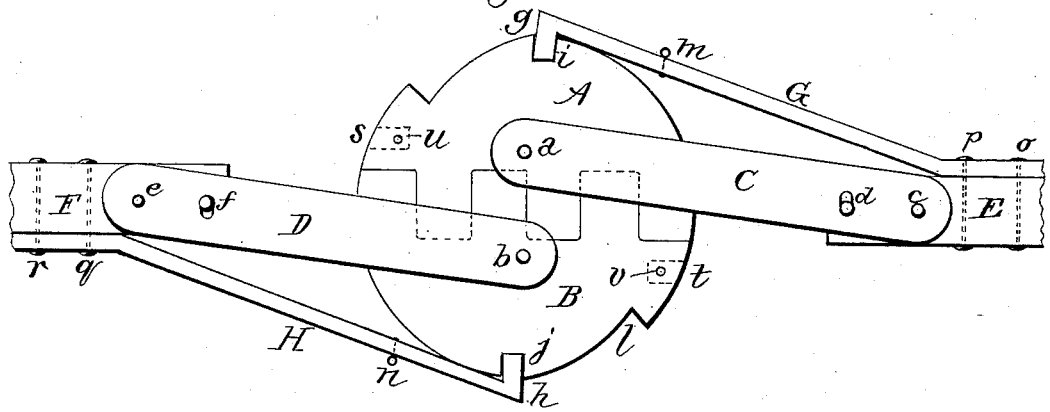
Figure 2:
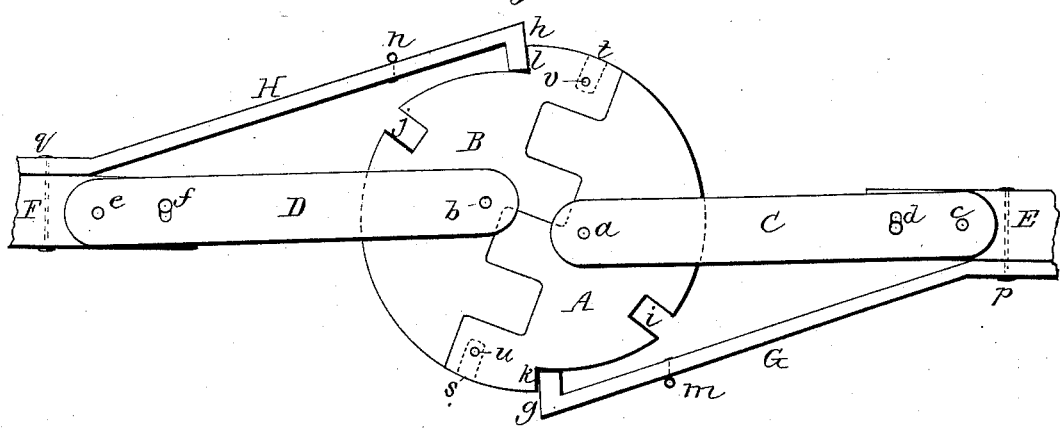
Figure 3:
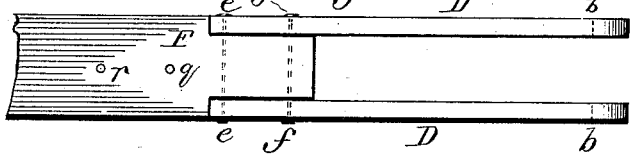

Figure 1 represents a top view of the machine when it is closed and fastened and the two parts coupled together. Fig. 2 represents a view of the opposite side of the machine from that shown in Fig. 1 and when the machine or coupler is unfastened and ready to be drawn apart. Fig. 3 represents a side view of the draw-bar F, with the side bars, D D, attached thereto.

Similar letters refer to similar parts throughout the several views.

A and B represent the circle-head, which is made in two parts, and which locks together when the two parts of the coupler are pushed together.

C D represent the side bars, which are attached to the draw-bars E F, and which carry and hold in place the parts of the circle-head A and B.

E and F represent the draw-bars, which are attached to the cars, vehicles, or other apparatus to be coupled together.

G and H represent the springs, which are attached to the draw-bars, and which keep the circle-head in place when closed or locked together, and also keep the parts of the circle-head from turning too far when the coupler is open or unlocked.

The side bars, C and D, are attached to the circle-head by bolts or rivets, (represented at $a$ $b$,) and they are attached to the draw-bars E and F by bolts or rivets, (shown at $c\ d\ e\ f$.) At $d$ and $f$ the hole in the side bar through which the bolt or rivet passes is elongated, so as to permit the side bars to give or move to one side when the circle-head is being opened or closed.

The springs G and H are fastened to the draw-bars E and F by bolts or rivets, (shown at $o\ p\ q\ r$,) and when the coupler is closed by pushing the parts of the circle-head together the spring-heads $g$ and $h$ drop into the slots $i$ and $j$ in the circle-head and hold the coupler locked or closed and fastened together, and when the parts of the coupler are separated by being drawn apart said spring-heads $g$ and $h$ rest at the end of the cams and against the shoulders (shown at $k$ and $l$) in the circle-head A and B, holding the parts of the circle-head in place when open and preventing them from turning too far.

At $m$ and $n$ in the springs G and H are rings, hooks, or loops attached to said springs, to which can be attached chains or levers for the purpose of drawing and holding the spring-heads $g$ and $h$ out of the slots $i$ and $j$. This may be done by attaching the chain to a brake rod or lever, and be operated by turning a brake-head on top of or at one side of the car, vehicle, or other apparatus which requires a coupler; or the brake-head may be placed on a platform at the end of the car, vehicle, or apparatus, or in any other desirable or convenient place or position; or the same purpose may be accomplished by using a lever attached at m and n, and operated at any position desired, and the springs prevented from returning by a ratchet attached to the brake rod or lever.

At s and t openings are made in the circle-head, so that a ring or link may be inserted and fastened with a bolt or pin passing through holes made at u and v, so as to attach either part of this coupler by a ring or link and pin to any other apparatus which may be desired, or to attach the two parts of this coupler together with a link and pins, the link being inserted at s and t and held by pins passing through at u and v.

The draw-bars E and F may be fastened to the cars or vehicles in place of and in the same way that ordinary draw-bars are now fastened to cars, or they may be attached in any other manner desired. The ends of the draw-bars, which are cut away, as shown in the drawings, may be prolonged and made in any way or shape that may be desired, and attached in any suitable manner.

Bunters may be placed above the draw-bars E and F, attached to the cars, vehicles, or other apparatus, to prevent too much strain upon the coupler in case the cars, vehicles, or other apparatus are thrust violently together.

All the slack or looseness of this coupler that may be desired may be provided for and obtained by leaving space between the two parts of the circle-head where they come together by making the slots i and j wider than the spring-heads g and h, or by making the hole in the draw-bars C and D, where the bolts or rivets pass through at a and b, elongated lengthwise of said draw-bars.

What I claim, and desire to secure by Letters Patent of the United States, is—

1. The combination, in a coupler for cars, vehicles, or other apparatus, of the circle-head A B with the side bars, C C and D D, the springs G H, and the draw-bars E and F, all substantially as set forth.

2. The combination, in a coupler for cars, vehicles, and other apparatus required to be coupled together, of the revolving circle-head in two parts, A and B, the vibrating side bars, C C and D D, carrying and keeping in place the parts of said circle-head and moving on the bolts or rivets at a b c d as said circle-head revolves back and forth, the springs G and H, attached to the draw-bars E and F, with the spring-heads g and h, so constructed and attached as to work on the cams from i to k and from j to h and rest in the slots at i and j, and the draw-bars E and F, with the side bars and springs attached thereto, all substantially as set forth.

In testimony whereof I have affixed my signature in presence of two witnesses.

THOMAS W. HARRISON.

Witnesses:
 W. L. LINDERMAN,
 S. W. ANDERSON.